Nov. 12, 1946.     M. SANZ     2,411,116
SELF-HEALING CONTAINER FORMING MATERIAL
Filed March 21, 1942
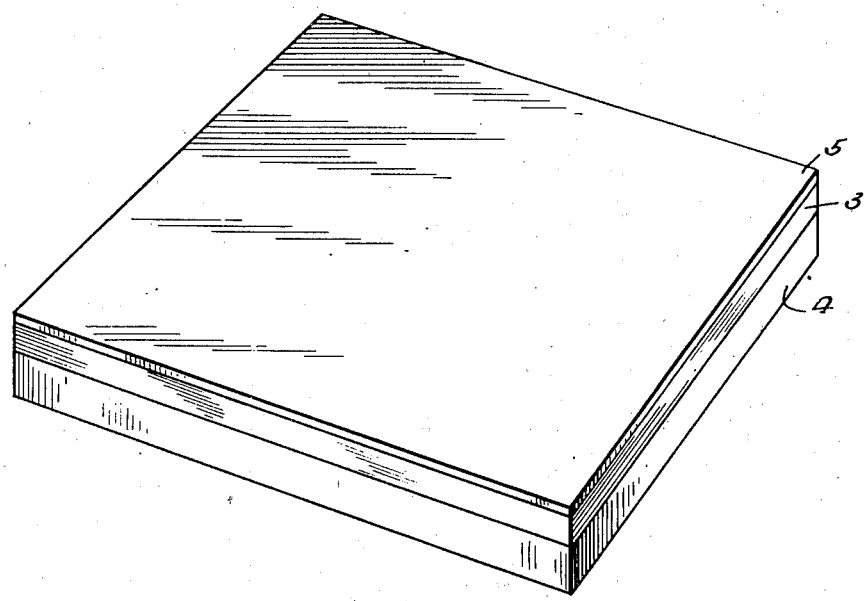
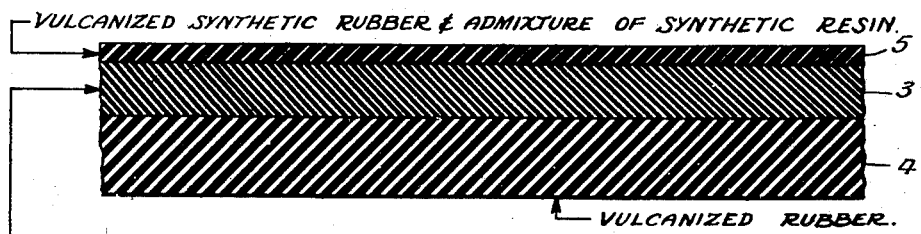
Inventor:
Manuel Sanz Patented Nov. 12, 1946

2,411,116

UNITED STATES PATENT OFFICE 2,411,116

SELF-HEALING CONTAINER FORMING MATERIAL

Manuel Sanz, Los Angeles, Calif., assignor, by mesne assignments, to Consolidated Vultee Aircraft Corporation, a corporation of Delaware Application March 21, 1942, Serial No. 435,689

4 Claims. (Cl. 154—43.5)

The present invention relates generally to self healing material. More particularly the invention relates to that type of material which is designed primarily for use in the fabrication of a fuel or lubricant container, automatically seals itself immediately after being punctured or torn by a projectile or like object, and comprises a self healing intermediate layer of masticated rubber having pronounced cohesiveness, an outer layer of tough elastic material, such, for example, as fully cured or vulcanized rubber, and an inner layer of synthetic rubber or like material of the type that is insoluble in, and unaffected by, hydrocarbons.

The primary object of the invention is to provide a self healing container forming material of this type which has certain advantages over, and is more efficient than, previously designed materials, especially that which is disclosed in, and forms the subject matter of, application for United States Letters Patent filed by Scott Rethorst on July 29, 1940, Serial No. 348,098 (now Patent No. 2,406,903, dated September 3, 1946).

Another object of the invention is to provide a self healing material of the type and character under consideration in which the self healing intermediate layer is formed of partially cured or vulcanized masticated rubber and has an admixture of a small amount of synthetic resin which is insoluble in hydrocarbons.

A further object of the invention is to provide a composite or laminated self healing material of the aforementioned type in which the inner layer of vulcanized synthetic rubber is vulcanized in situ on the inner face of the self healing intermediate layer and has an admixture of a small amount of a synthetic resin which serves as an efficient plasticizer for the synthetic rubber while at the same time it does not affect in any way the resistance of the synthetic rubber to gasoline, oil or other hydrocarbons.

A still further object of the invention is to provide a self healing container forming material which is generally an improvement in the art, effectively and efficiently fulfills its intended purpose and may be manufactured at a comparatively low cost.

Other objects of the invention and the various advantages and characteristics of the present self healing container forming material will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a perspective of a piece of self healing container forming material embodying the invention; and Figure 2 is an enlarged section of the material.

The material which is illustrated in the drawing constitutes the preferred form or embodiment of the invention. It is essentially of the self healing variety and has special capability of use in the fabrication of a gasoline or lubricant container for an airplane or other vehicle. Generally speaking, the material is a laminated or lamellated structure and is of the so-called self healing variety by reason of the fact that immediately after being punctured or torn it seals automatically. When the material is used to form an airplane fuel container any bullet or projectile passing through it results in no loss of fuel due to the special self healing tendencies or properties of the material. As its components the material comprises an intermediate layer 3, an outer layer 4 and an inner layer 5. These three layers are bonded together as hereinafter described, with the result that the material is essentially of unitary character.

The intermediate layer 3 is the self healing layer and possesses its self healing attributes due to its chemical and physical properties. It is formed for the most part of partially cured masticated rubber and is characterized by the fact that it has an extreme or pronounced degree of cohesiveness. This marked degree of cohesiveness results in the layer having the desired self healing action. The layer 3 is formed by mixing together the following components or ingredients in substantially the proportions set forth and then subjecting them to a vulcanizing temperature in order to obtain a partial cure:

|  | Parts by weight |
|---|---|
| Masticated rubber | 100 |
| Zinc oxide | 2 |
| Agent for producing partial cure | ¼ |
| Synthetic resin | 3 |

Pale crepe rubber is preferably used as the rubber component. Such rubber is preferably masticated to the desired degree of plasticity by milling it together with the other ingredients or components. The zinc oxide serves as an anti oxidant and also as an activator for the agent for effecting partial cure. For such agent tetramethylthiuram disulphide or tetramethylthiuram tetrasulphide is used. Tetramethylthiuram disulphide is known commercially as "Tuads" and tetramethylthiuram tetrasulphide is known commercially as "Tetrone." Because of the small amount of the agent and the fact that the agent (tetramethylthiuram disulphide or tetramethylthiuram tetrasulphide) possesses but a small quantity of sulphur the rubber component of the composition constituting the layer 3 is only partially cured or vulcanized when it is subjected to heat for vulcanizing purposes. Glycol-sebacate is preferably used as the synthetic resin component. This particular material is insoluble in, and unaffected by, hydrocarbons and has several functions or purposes. In the first place it operates as a plasticizer for the pale crepe rubber during mastication of the latter by milling. In addition it tends to make the layer 3 plastic. Another function of the synthetic resin is to increase the strength of the partially cured rubber component of the layer 3. The synthetic resin, although insoluble in, and unaffected by, hydrocarbon, such as gasoline, does not change to any great degree the normal properties of the masticated pale crepe rubber. It does, as previously pointed out, give strength to the layer as a whole. When the layer 3 is punctured by a bullet or other projectile the torn edges are drawn together in response to the herein described action of the outer layer 4. As soon as such edges are drawn into contact with one another a sealing action is effected due to the marked or pronounced degree of cohesiveness of the layer 3. Because a slight amount of gasoline flows into the cut or tear a swelling action takes place and this assists in effecting automatic sealing. This swelling is due to the chemical action which takes place when the partially cured rubber is contacted by the gasoline. By having a small amount of synthetic resin, such as glycol-sebacate, in the layer 3 the torn edges of the punctured portion of the layer have sufficient resistance to the gasoline so that the seal obtained by cohesion and swelling is not weakened or dissolved by the gasoline. Glycol-sebacate is a polymerized ester of the alkyd type and is known commercially as "Dyal 1929." In lieu of glycol-sebacate, glycerol phthalate may be used. In producing the layer 3 the various components or ingredients are introduced into a mill and are then milled until the composition has a plasticity of 250 as measured by a Williams parallel plate plastometer. After milling to the proper extent the composition is calendered into layer form. It is then subjected to a temperature of approximately 287° F. for forty minutes. During the high temperature period to which the composition is subjected a partial cure or vulcanization of the pale crepe rubber component is obtained. The final product constituting the layer 3 is pronouncedly elastic but has substantially no adhesiveness or tackiness. It is, however, plastic and possesses an extremely high degree of cohesiveness.

The outer layer 4 serves as a reenforcing or strengthening medium for the self healing intermediate layer 3 and is coextensive with the latter. It is permanently bonded to the outer face of the layer 3 and is formed of fully cured or vulcanized rubber. In practice it has been found that desirable results are obtained when the outer layer is formed of vulcanized rubber having a hardness of approximately 65 as measured by a Shore durometer and in addition tensile strength of approximately 3500 pounds per square inch and an elongation of 550 per cent at break. Vulcanized rubber of this character is relatively hard and has such elasticity that when compressed by the passage of a projectile therethrough it returns to its normal position and thereby closes the hole or puncture. When the material is punctured the punctured portion of the outer layer 4 springs together or contracts and hence draws together the punctured portion of the intermediate layer 3. As soon as the punctured portion of the intermediate layer is drawn together by the action of the outer layer such portion seals, as hereinbefore pointed out, due to cohesiveness and swelling. The outer layer 4 is formed by sheeting out into layer form a mass of rubber having sulphur or any other vulcanizing agent therein together with a suitable accelerator for the vulcanizing agent and a small quantity of zinc oxide for activating the accelerator. After sheeting of the mass to form the layer 4 said layer is brought into contact with the layer 3 and the two layers are subjected to heat. During the heating step the composition or rubber mass constituting the outer layer 4 is fully vulcanized and the composition constituting the intermediate layer 3 is partially vulcanized. As heretofore pointed out, a temperature of approximately 287° F. is employed for vulcanizing purposes and the material is subjected to such temperature for forty minutes. During the vulcanizing operation there is a slight migration of the sulphur or other vulcanizing agent in the outer layer into the outer face of the intermediate layer 3. Such migration results in the outer layer becoming permanently bonded to the intermediate layer.

The inner layer 5 is coextensive with, and permanently bonded to, the inner face of the intermediate layer 4. It is formed of vulcanized synthetic rubber and an admixture of synthetic resin. "Neoprene" [chloroprene] or "Thiokol" [an olefin polysulfide reaction product] may be used as the synthetic rubber component of the inner layer 5. Glycol-sebacate is preferably used as the synthetic resin. In practice it has been found that such a resin when used in an amount of from 1% to 10% by weight of the synthetic rubber produces the desired results. The synthetic resin, that is, the glycol-sebacate, serves as a plasticizer for the synthetic rubber and makes it possible readily and evenly to sheet the composition constituting the inner layer in connection with formation of such layer. In forming the inner layer the synthetic resin is milled or otherwise mixed with the synthetic rubber and the resultant mass is then sheeted onto the inner face of the intermediate layer 3 prior to the vulcanizing step. During the vulcanizing step vulcanization of the inner layer occurs and the latter becomes permanently bonded to the inner face of the intermediate layer 3. The inner layer, by reason of the fact that it is formed of synthetic rubber, such as "neoprene" or "Thiokol," and synthetic resin, such as glycol-sebacate, is insoluble in, and unaffected by, gasoline or other hydrocarbons and hence when the material is used to form a fuel container the fuel is prevented from contacting and affecting the intermediate layer 3 of partially cured masticated rubber. The inner layer is tough, elastic and flexible and when punctured the punctured portion springs back and draws with it the adjacent punctured portion of the intermediate layer 3. The punctured portion of the inner layer permits a small portion of gasoline to flow into the cut or punctured portion of the intermediate layer and this results in swelling of the punctured portion of the intermediate layer, as heretofore pointed out. In practice it has been found that desirable results are obtained when the synthetic rubber constituting the inner layer 5 has a hardness of approximately 35 as measured by a Shore durometer. Because glycol-sebacate, the material that is used as the plasticizing agent for the synthetic rubber component of the inner layer, is insoluble in, and unaffected by, hydrocarbons, the hydrocarbon resisting properties of the synthetic rubber are not affected. By having glycol-sebacate or a similar synthetic resin in the inner layer as well as the intermediate layer an efficient bond between the two layers is obtained.

The thickness of each layer is immaterial, although it has been found in practice that good results are obtained when the inner layer 5 is 3/32 of an inch in thickness; the intermediate layer 3 is 1/8 of an inch in thickness; and the outer layer 4 is 1/8 of an inch in thickness.

The herein described material effectively and efficiently fulfills its intended purpose and has marked or pronounced self healing properties.

Whereas the material has been described as being primarily for use in the manufacture of fuel containers it is to be understood that it is capable of being used for other purposes. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A container forming material comprising a self healing intermediate layer formed of masticated partially cured rubber having an extremely high degree of cohesiveness but substantially no tackiness or adhesive tendency, and a uniformly dispersed admixture of a synthetic resin selected from the group composed of glycol-sebacate and glycerol phthalate and in such amount that it serves as a plasticizer for, and to increase the strength of, the masticated partially cured rubber without inhibiting swelling of said rubber when the latter is contacted by hydrocarbons, an outer layer of tough highly elastic vulcanized rubber bonded to the outer face of, and serving to reenforce, the self healing layer and adapted in connection with puncture of the material to have its punctured portion contract and draw together the punctured portion of the self healing layer, and an inner layer bonded to the inner face of the intermediate layer and formed of vulcanized synthetic rubber that is insoluble in, and unaffected by, hydrocarbons.

2. A container forming material comprising a self healing intermediate layer formed of masticated partially cured rubber having an extremely high degree of cohesiveness but substantially no tackiness or adhesive tendency, and a uniformly dispersed admixture of a synthetic resin selected from the group composed of glycol-sebacate and glycerol phthalate and in such amount that it serves as a plasticizer for, and to increase the strength of, the masticated partially cured rubber without inhibiting swelling of said rubber when the latter is contacted by hydrocarbons, an outer layer of tough highly elastic vulcanized rubber vulcanized in situ on the outer face of, and serving to reenforce, the self healing layer and adapted in connection with puncture of the material to have its punctured portion contract and draw together the punctured portion of the self healing layer, and an inner layer of vulcanized synthetic rubber vulcanized in situ on the inner face of the intermediate layer and selected from the group consisting of Chloroprene and an olefin polysulfide reaction product.

3. A container forming material comprising a self healing intermediate layer formed of masticated partially cured rubber having an extremely high degree of cohesiveness but substantially no tackiness or adhesive tendency, and a uniformly dispersed admixture of a synthetic resin selected from the group composed of glycol-sebacate and glycerol phthalate and in such amount that it serves as a plasticizer for, and to increase the strength of, the masticated partially cured rubber without inhibiting swelling of said rubber when the latter is contacted by hydrocarbons, an outer layer of tough highly elastic vulcanized rubber bonded to the outer face of, and serving to reenforce, the self healing layer and adapted in connection with puncture of the material to have its punctured portion contract and draw together the punctured portion of the self healing layer, and an inner layer bonded to the inner face of the intermediate layer and formed of vulcanized synthetic rubber selected from the group consisting of Chloroprene and an olefin polysulfide reaction product and a uniformly dispersed admixture of glycol-sebacate in sufficient amount to plasticize the vulcanized synthetic rubber and also promote adhesion of the latter to said inner face of the intermediate layer.

4. A container forming material comprising a self healing intermediate layer formed of masticated partially cured rubber having an extremely high degree of cohesiveness but substantially no tackiness or adhesive tendency, and a uniformly dispersed admixture of a synthetic resin selected from the group composed of glycol-sebacate and glycerol phthalate and in such amount that it serves as a plasticizer for, and to increase the strength of, the masticated partially cured rubber without inhibiting swelling of said rubber when the latter is contacted by hydrocarbons, an outer layer of tough highly elastic vulcanized rubber vulcanized in situ on the outer face of, and serving to reenforce, the self healing layer and adapted in connection with puncture of the material to have its punctured portion contract and draw together the punctured portion of the self healing layer, and an inner layer formed of vulcanized synthetic rubber vulcanized in situ on the inner face of the self healing layer and selected from the group composed of Chloroprene and an olefin polysulfide reaction product and a uniformly dispersed admixture of glycol-sebacate in sufficient amount to serve as a plasticizer for the vulcanized synthetic rubber and also to promote adhesion of the latter to said inner face of the intermediate layer.

MANUEL SANZ.